(12) United States Patent
Aksu et al.

(10) Patent No.: US 9,832,591 B2
(45) Date of Patent: Nov. 28, 2017

(54) INSTALLATION OF A VOICE CLIENT FOR ROAMING DEVICES IN A WIRELESS NETWORK

(71) Applicant: Verizon Patent and Licensing Inc., Arlington, VA (US)

(72) Inventors: Arda Aksu, Martinez, CA (US); William H. Stone, Doylestown, PA (US); Sanyogita Shamsunder, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 71 days.

(21) Appl. No.: 14/194,408

(22) Filed: Feb. 28, 2014

(65) Prior Publication Data

US 2014/0185526 A1 Jul. 3, 2014

Related U.S. Application Data

(63) Continuation-in-part of application No. 13/907,840, filed on May 31, 2013, which is a continuation-in-part of application No. 13/730,041, filed on Dec. 28, 2012, now abandoned.

(51) Int. Cl.
*H04J 1/16* (2006.01)
*H04W 4/00* (2009.01)
*H04W 8/12* (2009.01)

(52) U.S. Cl.
CPC .............. *H04W 4/001* (2013.01); *H04W 8/12* (2013.01)

(58) Field of Classification Search
None
See application file for complete search history.

(56) References Cited

U.S. PATENT DOCUMENTS

| | | | | |
|---|---|---|---|---|
| 8,725,114 | B2 * | 5/2014 | Syal | H04W 8/205 455/411 |
| 8,805,323 | B2 * | 8/2014 | Ramprasad et al. | 455/405 |
| 2007/0047523 | A1 | 3/2007 | Jiang | |
| 2008/0153482 | A1 | 6/2008 | Kongalath | |
| 2012/0196655 | A1 * | 8/2012 | Fischer | H04W 8/245 455/558 |
| 2012/0275442 | A1 | 11/2012 | Malets et al. | |
| 2013/0010752 | A1 * | 1/2013 | Rydnell et al. | 370/331 |
| 2013/0029637 | A1 | 1/2013 | Hillier et al. | |
| 2014/0007083 | A1 * | 1/2014 | Baldwin | H04L 65/1016 717/178 |

(Continued)

*Primary Examiner* — Kwang B Yao
*Assistant Examiner* — Juvena Loo

(57) ABSTRACT

A mobile device may obtain wireless network connectivity from a local telecommunications provider by replacing a card in a mobile device associated with the user. In one implementation, a method may include receiving identification information relating to a mobile device; determining, based on the identification information, that the mobile device is compatible with a wireless network; transmitting, based on the determination that the mobile device is compatible with the wireless network, a Voice over Long Term Evolution (VoLTE) client application to the mobile device, the VoLTE client application providing functionality, for the mobile device, relating to usage of VoLTE services in the wireless network; and communicating, with the mobile device and the VoLTE client application, to provide one or more VoLTE services to the mobile device.

20 Claims, 15 Drawing Sheets

(56) References Cited

U.S. PATENT DOCUMENTS

| | | | |
|---|---|---|---|
| 2014/0011492 A1* | 1/2014 | Bharadwaj | H04L 65/1016 455/422.1 |
| 2014/0162676 A1* | 6/2014 | Shaw | H04W 76/00 455/452.2 |
| 2015/0113044 A1* | 4/2015 | Noldus | 709/203 |

* cited by examiner

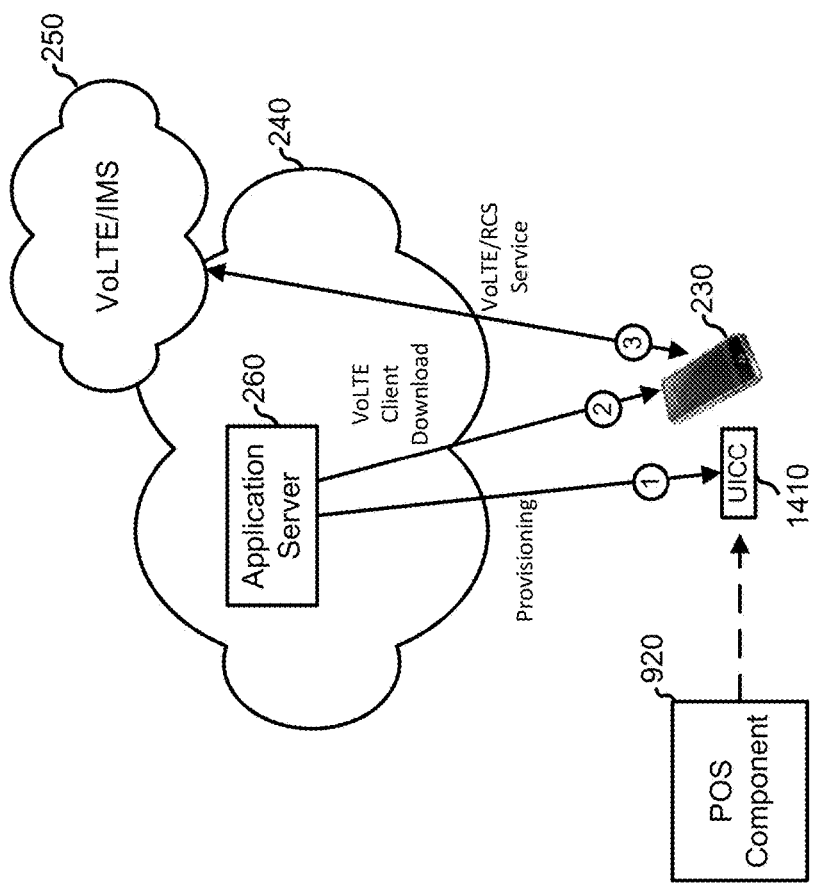

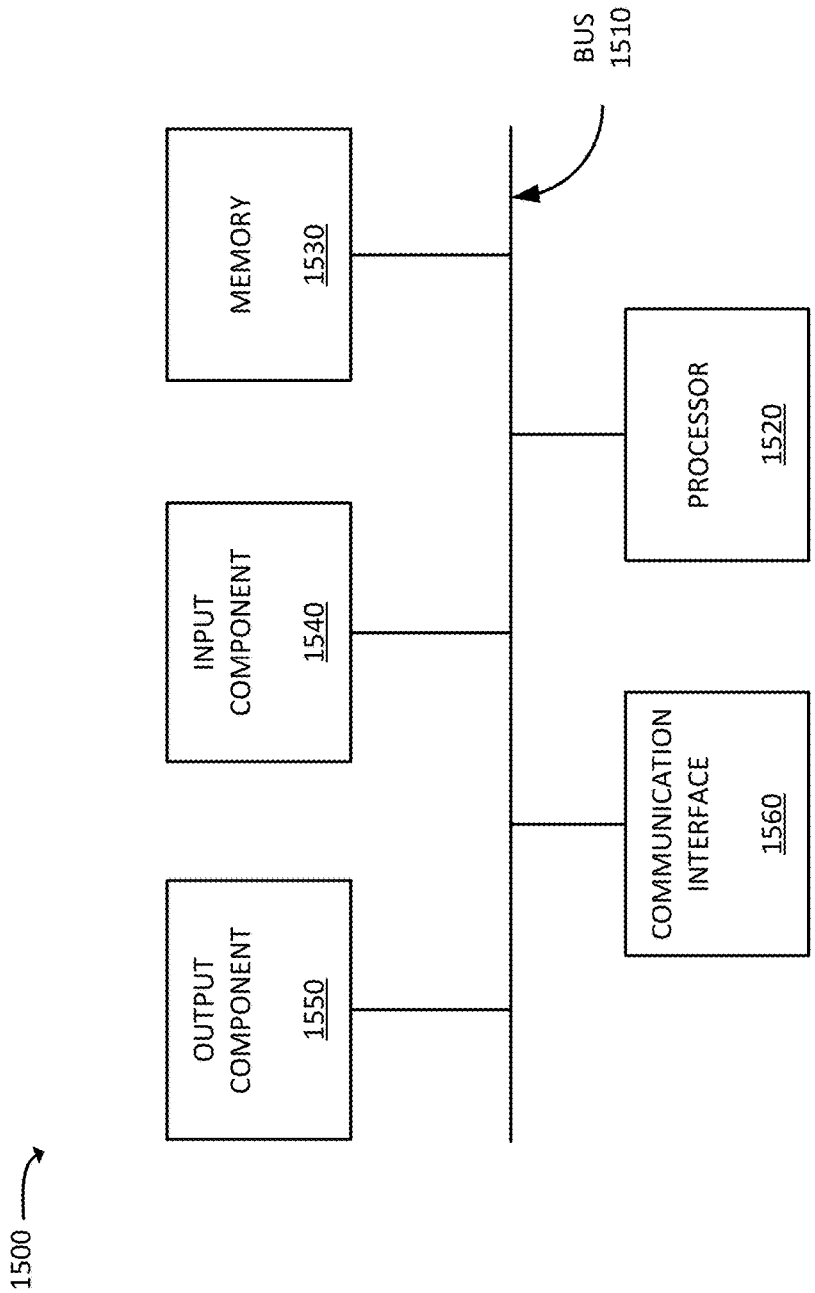

INSTALLATION OF A VOICE CLIENT FOR ROAMING DEVICES IN A WIRELESS NETWORK

RELATED APPLICATIONS

This application claims priority from and is a continuation-in-part (CIP) of U.S. patent application Ser. No. 13/730,041, filed Dec. 28, 2012, entitled "INSTALLATION OF A VOICE CLIENT FOR ROAMING DEVICES IN A WIRELESS NETWORK;" and this application claims priority from and is a continuation-in-part (CIP) of U.S. patent application Ser. No. 13/907,840, filed May 31, 2013, entitled "INSTALLATION OF A VOICE CLIENT FOR ROAMING DEVICES IN A WIRELESS NETWORK."

BACKGROUND

The Long Term Evolution (LTE) standard is a standard for wireless communication of high-speed data for mobile devices and data terminals. LTE is based on the GSM/EDGE (Global System for Mobile Communications/Enhanced Data rates for GSM Evolution) and UMTS/HSPA (Universal Mobile Telecommunications System/High Speed Packet Access) network technologies. Relative to GSM/EDGE and UMTS/HSPA, LTE may increase the capacity and speed of the wireless network based on improvements to the radio interface and improvements to the core network.

The LTE standard is based on packet switched IP networking and does not have inherent support for circuit-switched voice calls. Some telecommunications providers, when implementing the LTE standard, use the LTE network for data transmission while continuing to use other network standards/technologies, such as GSM or UMTS to handle voice calls. A number of approaches, however, have been developed to provide voice over LTE. One such approach is the Voice over LTE (VoLTE) standard.

BRIEF DESCRIPTION OF THE DRAWINGS

FIG. 14 is a diagram illustrating one example of signaling and/or data flows that may be used in the environment shown in FIG. 9; and FIG. 15 is a diagram of example components of a device.

DETAILED DESCRIPTION OF PREFERRED EMBODIMENTS

The following detailed description refers to the accompanying drawings. The same reference numbers in different drawings may identify the same or similar elements.

Techniques described herein may provide VoLTE service to a roaming mobile device, that attaches to an LTE network, even when the home network of the mobile device does not provide VoLTE service. The roaming mobile device may receive a VoLTE client application, such as a downloadable application, from the VoLTE-enabled LTE network. The VoLTE client application may enable the mobile device to subsequently place telephone calls, through the roaming network, using VoLTE.

Figure 1:
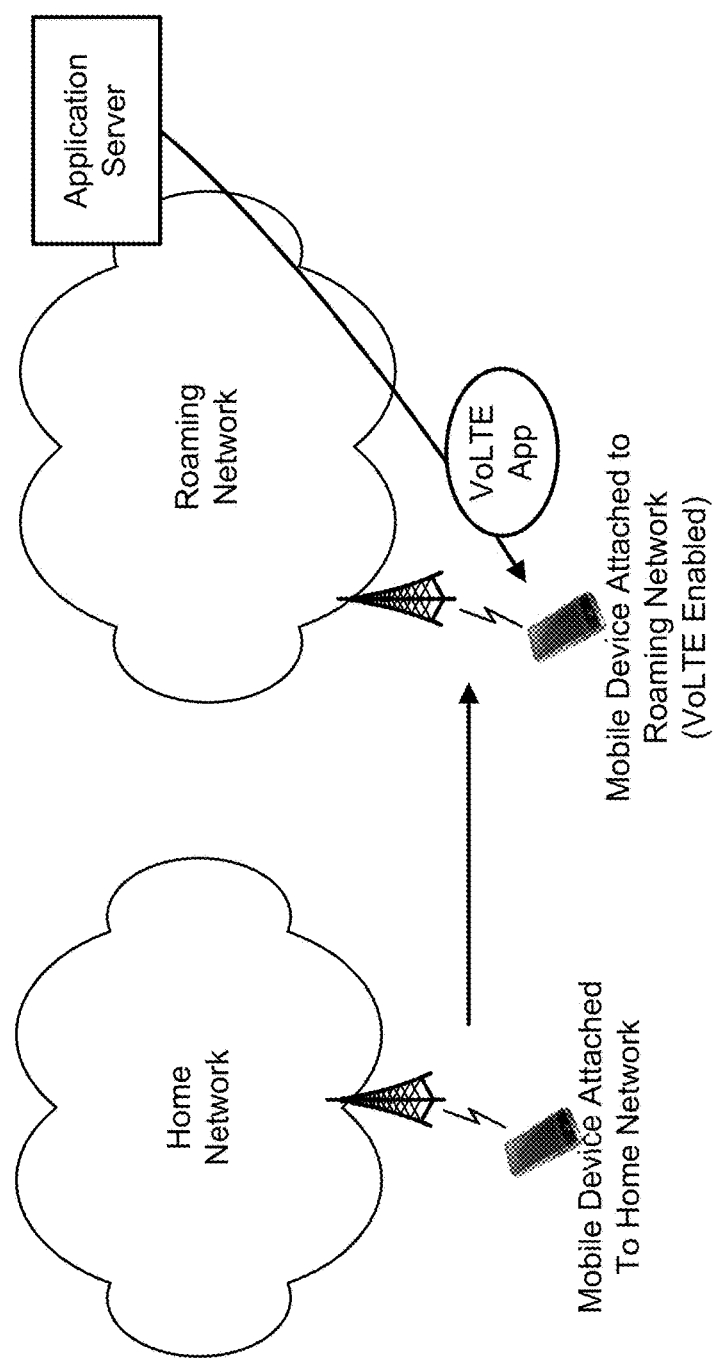
FIG. 1 is a diagram conceptually illustrating an example of an overview of concepts described herein.

FIG. 1 is a diagram conceptually illustrating an example of an overview of concepts described herein. As shown in FIG. 1, user equipment (UE), such as a mobile device, may be associated with a home network (i.e., a wireless network maintained by a telecommunications operator of which the user of the mobile device is a customer). The home network may be a network that does not include support for voice calls made using VoLTE. For instance, voice calls in the home network may be implemented using circuit switched technologies.

At some point, the mobile device may roam, which may refer to the mobile device being powered on in a geographical area in which there are no base stations, associated with the home network of the mobile device, within radio range. This may be the case, for example, when the user of the mobile device travels to an area outside of the geographical range of the home network (e.g., to a different country). The mobile device may, however, connect to another network (the roaming network). The roaming network may be a network in which the operator of the home network (e.g., a first telecommunications company) has established a roaming agreement with the operator of the roaming network (e.g., a second telecommunications company). Further, the roaming network may be an LTE network that uses VoLTE to provide voice services while the home network may not use VoLTE (e.g., the home network may provide circuit-switched voice connectivity).

Consistent with concepts described herein, the roaming mobile device may be enabled to use VoLTE voice services while attached to the roaming network. In one implementation, and as shown in FIG. 1, the roaming mobile device may receive a VoLTE client application ("VoLTE App"), such as an application that is downloaded from an application server associated with the roaming network. The VoLTE client application may provide functionality, to the mobile device, that may normally be provided as part of the core communication functionality of a mobile device that is designed to operate with the roaming network (e.g., a mobile device that uses the roaming network as its home network).

A VoLTE enabled mobile device may have a number of advantages relative to circuit switched voice technologies, such as higher fidelity voice calls, the ability to perform file transfers, the ability to use instant messaging services, and the ability to transmit presence information to the network. Advantageously, as described herein, a roaming mobile device may take advantage of these features of VoLTE even when the home network of the mobile device does not implement VoLTE.

Figure 2:
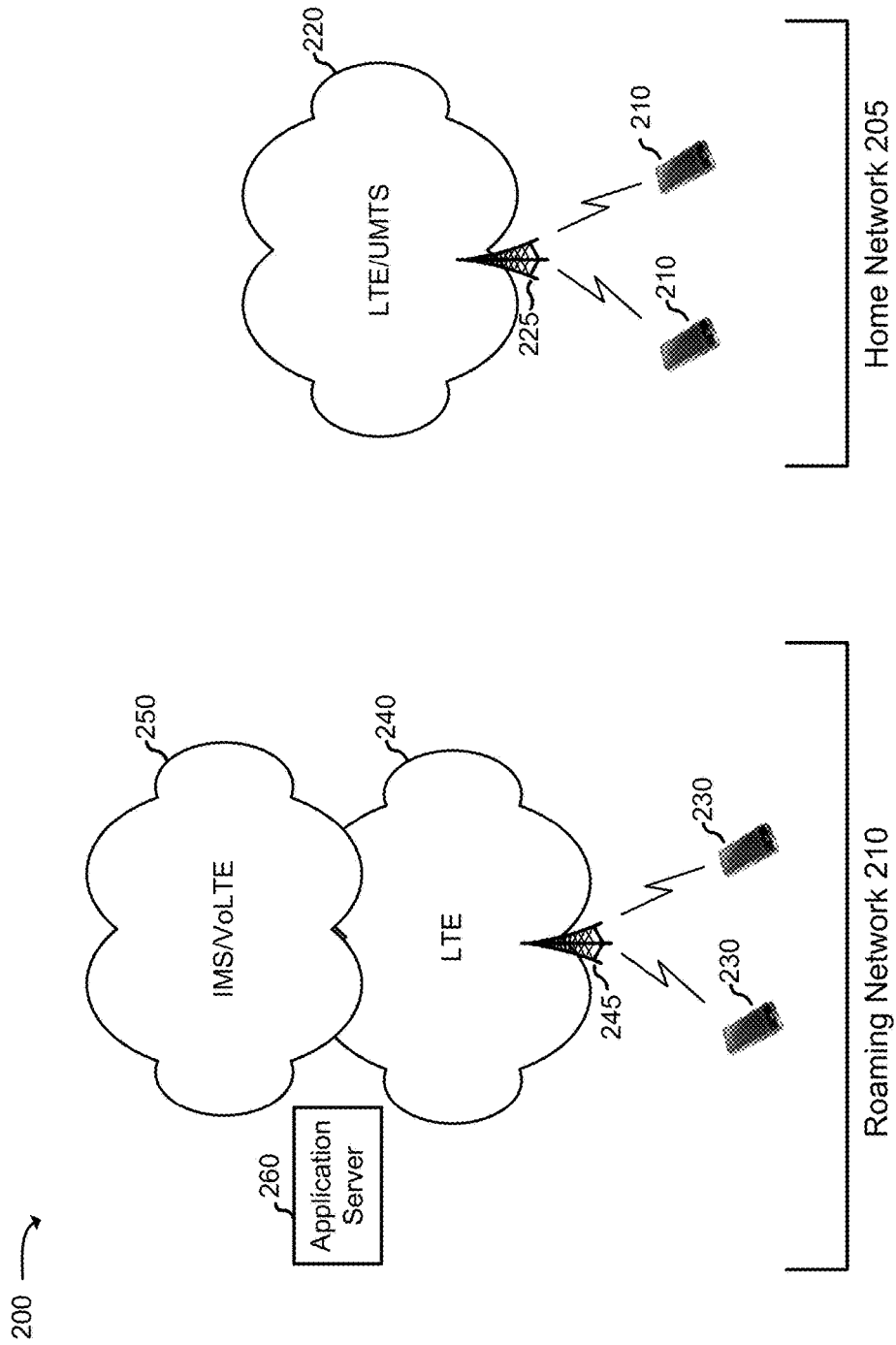
FIG. 2 is a diagram of an example environment in which systems and/or methods described herein may be implemented.

FIG. 2 is a diagram of an example environment 200 in which systems and/or methods described herein may be implemented. As illustrated, environment 200 may include at least two telecommunications networks: home network 205 and roaming network 210. Home network 205 and roaming network 210 may, for example, each be associated with a different wireless telecommunications provider. The different wireless telecommunications providers may have established roaming agreements between one another, so that a mobile device ("user equipment" or "UE") from one of the networks may obtain wireless network connectivity when the UE is in a geographical area associated with the other of the networks (e.g., within range of a base station associated with the other network). A roaming agreement may generally refer to an agreement, between telecommunications providers, to provide service to customers of the other telecommunication provider.

Home network 205 may provide wireless network service to one or more UEs 210. Home network 205 may include, for example, a network based on the Long Term Evolution (LTE) network 220. Voice calls through network 220 may be handled using a circuit-switched technology, such as UMTS. LTE/UMTS network 220, as illustrated, may include one or more base stations 225, which, in the context of an LTE network, may be referred to as an Evolved Node B (eNodeB). In alternative implementation, LTE/UMTS network 220 may implement voice calls using technologies other than through UMTS.

Roaming network 210 may provide wireless network service to one or more UEs 230. Roaming network 210 may include, for example, a network based on the LTE standard, illustrated as LTE network 240. LTE network 240, as illustrated, may include one or more base stations (e.g., eNodeBs) 245.

LTE network 240 may use VoLTE to handle voice calls and/or to provide other services. VoLTE may be based on the IP Multimedia Subsystem (IMS) network standard. In general, IMS refers to an architecture designed to provide mobile and fixed multimedia services. IMS may use a standardized implementation of Session Initiation Protocol (SIP) and may run over IP networks. The devices and functionality that provide IMS/VoLTE, for LTE network 240, are illustrated in FIG. 2 as IMS/VoLTE network 250.

An application server 260 is additionally shown in FIG. 2. Application server 260 may provide services to UEs 230, such as services relating to the addition of additional functionality to UEs 230. In some implementations, application server 260 may provide updates to UEs 230, which may include providing software that allows UEs 230 to provide VoLTE services. For example, a VoLTE client application may be pushed to UEs 230 through an over the top (OTT) transmission, or the VoLTE client application to be downloaded to UEs 230 using other technologies. In some implementations, a user of UE 230 may be notified, such as via a text message, to the downloading and installation of the VoLTE client application before the VoLTE client application is installed.

UEs 210/230 may include portable computing and communication devices, such as a personal digital assistant (PDA), a smart phone, a cellular phone, a laptop computer with connectivity to a cellular wireless network, a tablet computer, etc. UEs 210/230 may also include non-portable computing devices, such as desktop computers, consumer or business appliances, set-top devices (STDs), or other devices that have the ability to connect to a wireless network. UEs 210/230 may connect, through a radio link, to base stations 225/245. Through the radio link, UEs 210/230 may obtain data and/or voice services.

Each base station 225/245 may provide radio interfaces over which the base station may communicate with UEs 210/230. The radio interfaces provided by base stations 225/245 may include, for example, orthogonal frequency-division multiplexing (OFDM) and/or single-carrier frequency-division multiple access (SC-FDMA) based radio interfaces.

Figure 3:
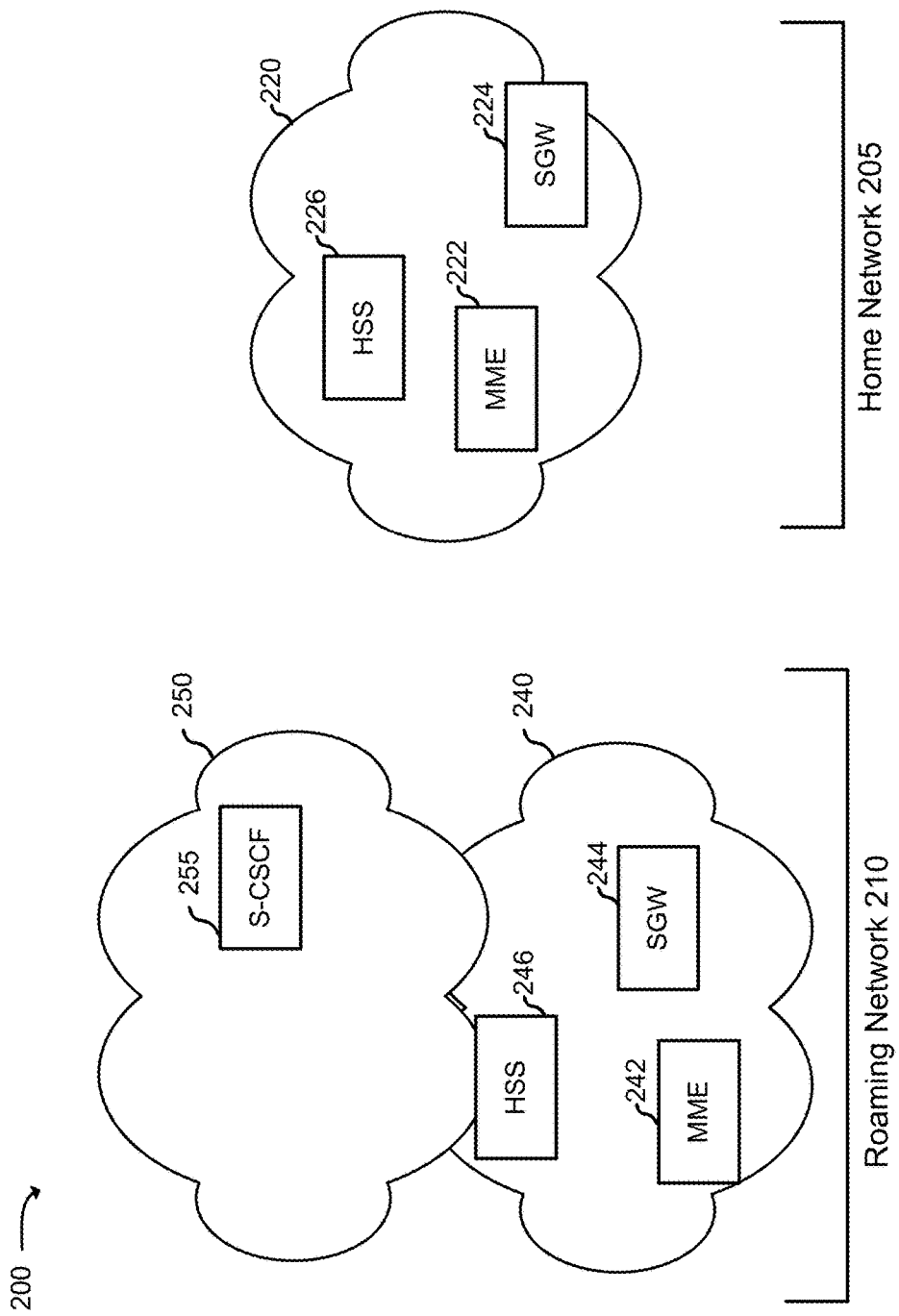
FIG. 3 is a diagram that illustrates a more detailed view of portions of the example environment shown in FIG. 2.

FIG. 3 is a diagram that illustrates a more detailed view of portions of example environment 200. In particular, certain elements of LTE/UMTS network 220, LTE network 240, and IMS/VoLTE network 250 are illustrated in additional detail.

As illustrated, LTE/UMTS network 220 may include one or more computation and communication devices that perform signaling for home network 205, including Mobility Management Entity (MME) 222, serving gateway (SGW) 224, and home subscriber server (HSS) 226. MME 235 may, for example, include one or more computation and communication devices that are responsible for authenticating UEs, maintaining location information for UEs, and selecting a packet gateway to service a particular UE (such as a gateway to another network). SGW 224 may include one or more computation and communication devices that route and forward user data packets. SGW 224 may also act as a mobility anchor during inter-base station handoffs. HSS 226 may include one or more computation and communication devices that act as a central database to maintain user-related and subscription-related information. HSS 226 may implement functionality relating to mobility management, call and session establishment support, user authentication, and access authorization.

LTE network 240 may include one or more computation and communication devices that perform signaling for roaming network 210, including MME 242, SGW 244, and HSS 246. MME 242, SGW 244, and HSS 246 may include functionality similar to that of MME 222, SGW 224, and HSS 226, respectively.

IMS/VoLTE network 250 may include one or more computation and communication devices that implement IMS/VoLTE functionality within the context of LTE network 240. As illustrated, IMS/VoLTE network 250 may include, for example, a serving Call Session Control Function (S-CSCF) 255. S-CSCF 255 may act as a SIP server and may also perform session control functions. S-CSCF 255 may determine the particular application servers to handle particular service requests and enforce network policy. S-CSCF 255 may implement interfaces to HSS 246, from which S-CSCF 255 may download subscriber profile information.

Although FIGS. 2 and 3 illustrate example components of environment 200, in other implementations, environment 200 may contain fewer components, different components, differently arranged components, or additional components than those depicted in environment 200. Alternatively, or additionally, one or more components of environment 200 may perform one or more other tasks described as being performed by one or more other components of environment 200.

Figure 4:
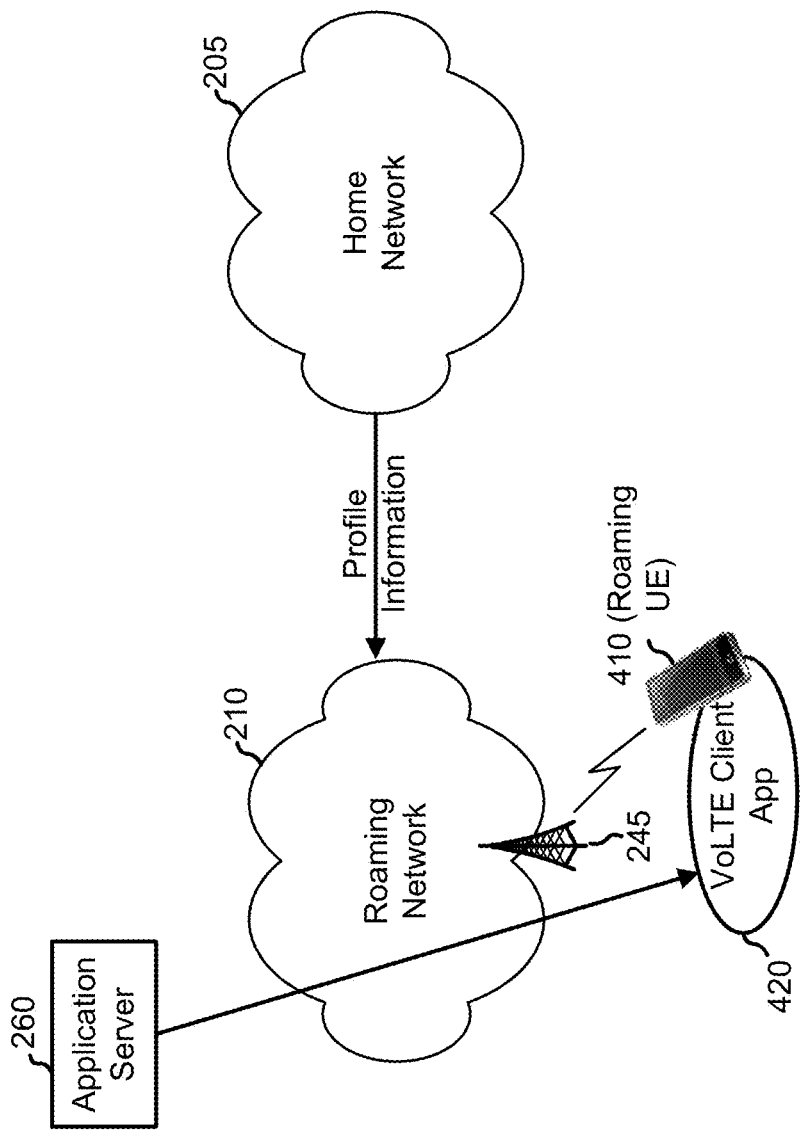
FIG. 4 is a diagram conceptually illustrating operation of components of the environment shown in FIG. 2.

FIG. 4 is a diagram conceptually illustrating operation of components of environment 200. As illustrated in FIG. 4, assume that UE 410, which may correspond to UE 210 or UE 230, is a UE that is registered for wireless service from home network 205. Further assume that the user of UE 410 has moved UE 410 to a geographical area that is not served by home network 205, but is served by roaming network 210. Providers associated with roaming network 210 and home network 205 may have an established roaming agreement.

During the attachment process to roaming network 210, such as through base station 245, roaming network 210 may determine that UE 410 does not include VoLTE capabilities. For example, roaming network 210 may obtain profile information, from home network 205, that describes the capabilities of UE 410. The profile information may indicate that home network 205 does not support VoLTE. Based on this profile information, roaming network 210 may determine that UE 410 may also not include support for VoLTE. Alternatively or additionally, the fact that UE 410 does not include support for VoLTE may be determined based on information obtained from other sources, such as directly from UE 410.

Application server 260 may push or otherwise transmit VoLTE client application 420 ("VoLTE client app") to UE 410. VoLTE client application 420 may enable UE 410 to use VoLTE services, such as placing a VoLTE-implemented telephone call, through roaming network 210. In some implementations, VoLTE client application 420 may enable features and/or services in addition to voice calls, such as services provided by the Rich Communication Services (RCS) suite. The services may include, for example, instant messaging, chat, live video sharing, video telephony, and file transfer.

Figure 5:
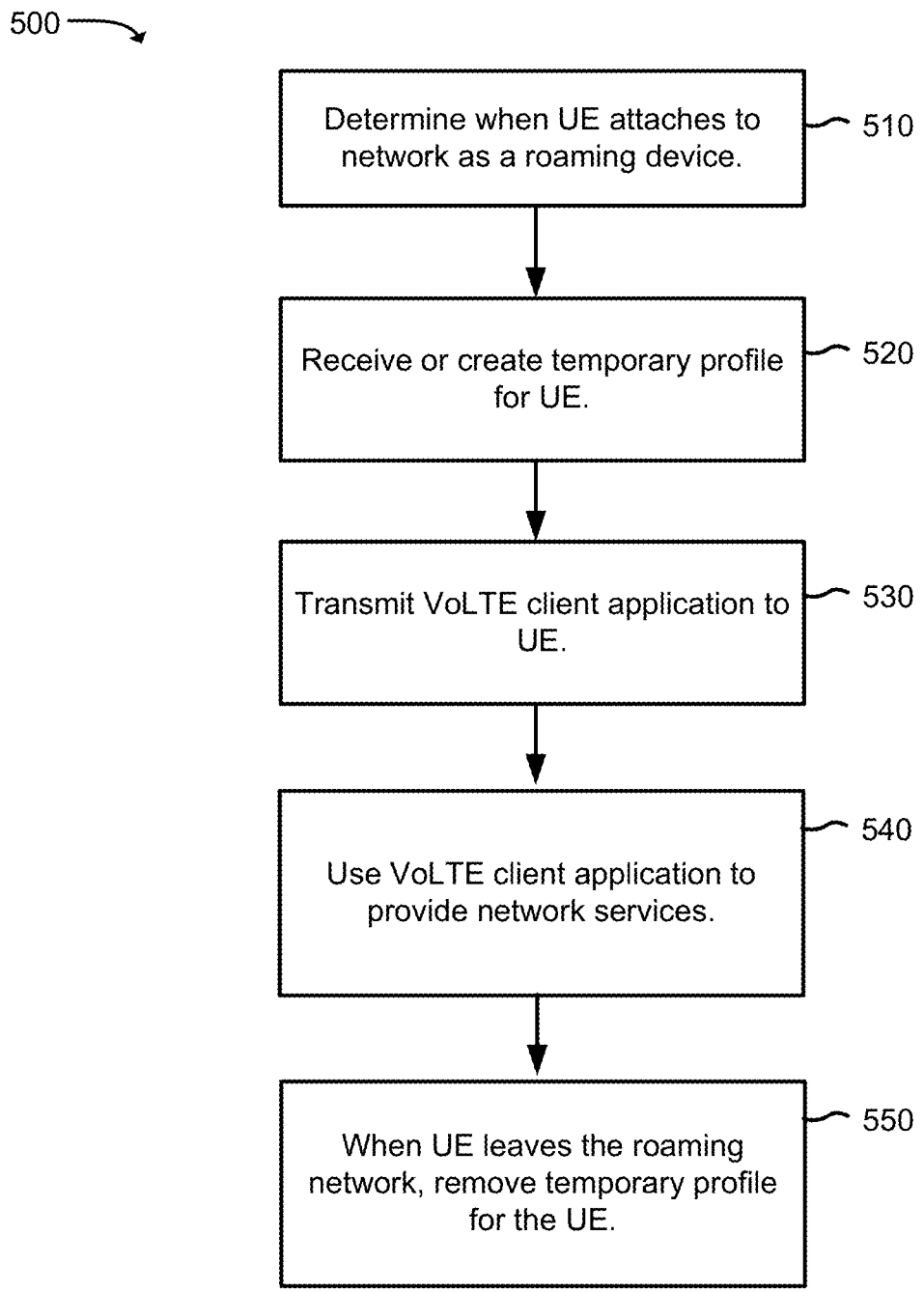
FIG. 5 is a flow chart illustrating an example process for providing VoLTE services to a device.

FIG. 5 is a flow chart illustrating an example process 500 for providing VoLTE services to a device, such as to a roaming UE. Process 500 may be implemented, for example, by one or more of the devices in LTE network 240 and/or IMS/VoLTE network 250, such as MME 242, SGW 244, HSS 246, and/or S-CSCF 255.

Assume that UE 410, associated with a particular home network 205, is taken to a geographical location in which the UE no longer has connectivity to home network 205. The UE may, however, be able to connect to a roaming network 210.

Process 500 may include determining that a UE attaches to a network as a roaming device (block 510). Attaching to a roaming network may include UE 410 wirelessly communicating, through base station 245, to LTE network 240 (e.g., a network that may be considered to be a roaming network, with respect to UE 410). For LTE network 240 to accept the connection to the roaming UE 410, home network 205 and roaming network 210 may have previously agreed upon a roaming agreement. The roaming agreement may specify, for example, billing terms and/or other terms relating to the usage of roaming network 210 by visiting UE 410.

Process 500 may further include creating or receiving a temporary profile for the UE (block 520). In one implementation, the roaming agreement between home network 205 and roaming network 210 may provide for the exchange of profile information. For example, roaming network 210, such as through MME 242 or another device, may request profile information for UE 410 from HSS 226, in home network 205. Alternatively or additionally, a profile may be created for UEs 410 based on information received from UE 410 as part of the attachment of the UE to roaming network 210. The profile may include, for example, information identifying the UE, information relating to the capabilities of the UE, and/or information relating to services subscribed to or available to the UE.

Process 500 may further include transmitting a VoLTE client application to the UE (block 530). For example, VoLTE client application 420 may be pushed, or otherwise downloaded, from application server 260. UE 410 may subsequently install the VoLTE client application 420.

Figure 6:
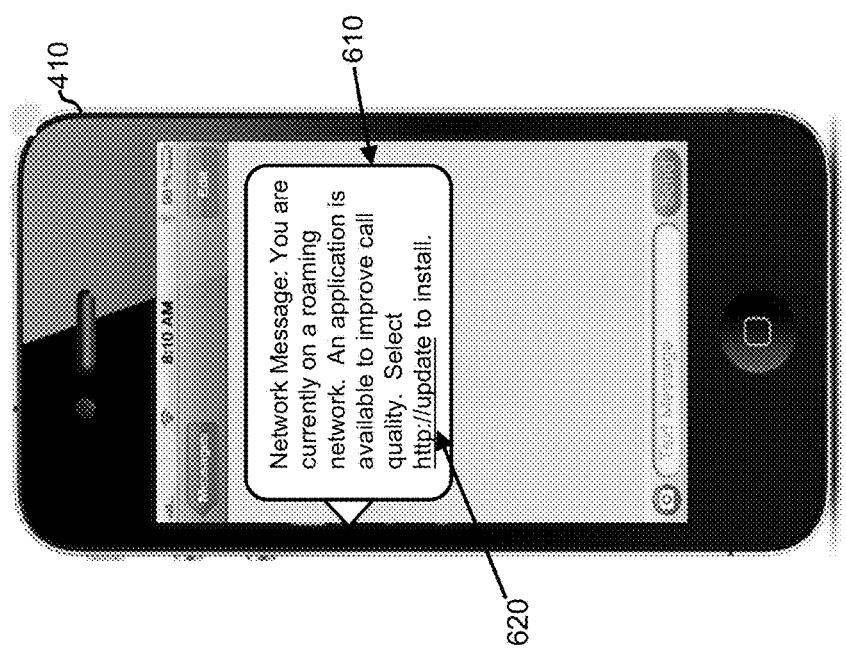
FIG. 6 is a diagram of an example interface that may be presented to a user of a device.

In some implementations, a text message or other message may be sent to UE 410 to inform the user, and/or to obtain permission from the user, to download and install VoLTE client application 420. FIG. 6 is a diagram of an example interface that may be presented to a user of UE 410 to ask permission to install VoLTE client application 420. As illustrated, a message, such as a Short Message Service (SMS) text message 610, may be sent to UE 410. Text message 610 may be sent, for example, in response to UE 410 initially attaching to roaming network 210. Text message 610 may inform the user that UE 410 is obtaining network service from a roaming network and that an application is available to improve the network experience. As illustrated, message 610 states: "You are currently on a roaming network. An application is available to improve call quality." In this example, user may be affirmatively required to select an option, such as link 620, to initiate installation of VoLTE client application 420. In some implementations, the user may also be presented with a fee structure associated with the use of UE 410 while roaming and/or user may be required to agree to an end-user license agreement (EULA) before downloading VoLTE client application 420.

In some implementations, instead of notifying the user of the availability of VoLTE client application 420, client application 420 may be automatically installed at UE 410 (e.g., without notifying and/or prompting the user). In general, a number of techniques, including automatic "push" based downloading techniques and techniques in which the user has a more active role in the installation of VoLTE client application 420, may potentially be used to download and install VoLTE client application 420 to UE 410.

A user of UE 410, at which VoLTE client application 420 is installed, may wish to use a VoLTE and/or RCS based network service, such as voice, instant messaging, chat, live video sharing, video telephony, and/or file transfer. Process 500 may include using the VoLTE client application to provide network services (block 540). For example, one or more devices, in IMS/VoLTE network 250, may interact with VoLTE client application 420 to provide the VoLTE and/or RCS based network services. For example, VoLTE client application 420 may implement one or more codecs and/or protocols needed to provide VoLTE based voice services (e.g., telephone calls), such as a VoLTE quality of service (QoS) codec. The temporary profile created for UE 410 may be used in providing the VoLTE and/or RCS based network services.

Figure 7:
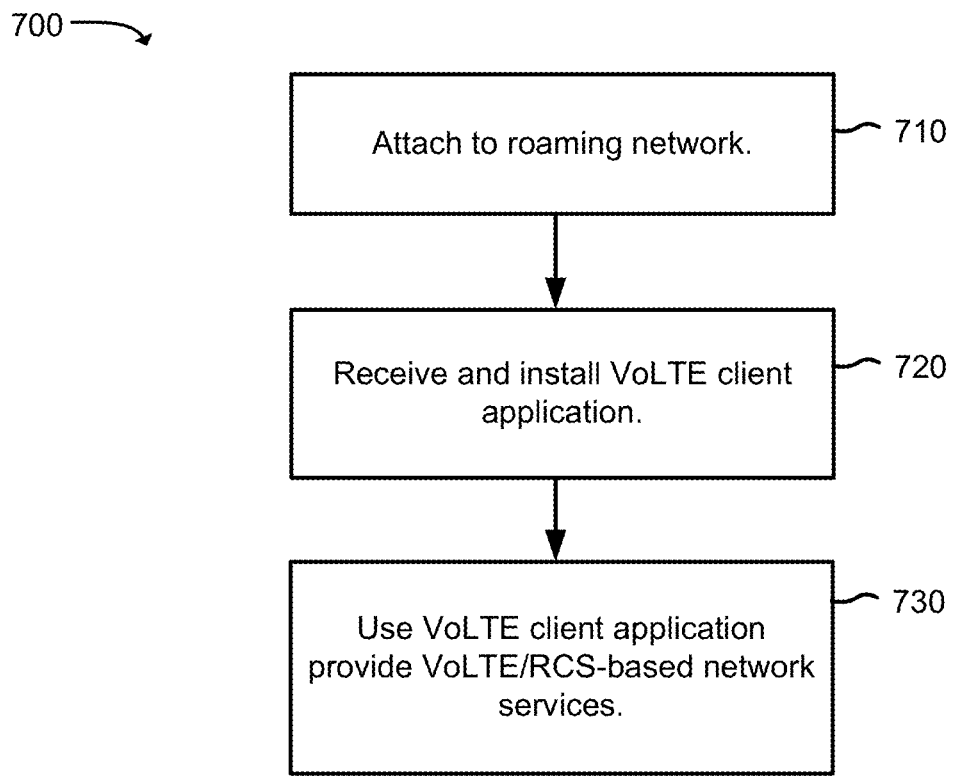
FIG. 7 is a flow chart illustrating an example process for providing VoLTE services at a mobile device.

At some point, UE 410 may no longer be associated with roaming network 210. For example, the user of UE 410 may return to the geographic area associated with home network 205. Process 500 may further include removing the temporary profile for UE 410 (block 550). In one implementation, the temporary profile may be removed based on a certain period of inactivity. For example, a temporary profile may be deleted when the corresponding UE 410 has not connected to roaming network 210 for a certain time period (e.g., two days). In some implementations, VoLTE client application 420 may be uninstalled when UE 410 is no longer be associated with roaming network 210. Alternatively, when UE 410 returns to home network 205, VoLTE client application 420 may not run or may otherwise not provide functionality in the context of home network 205. FIG. 7 is a flow chart illustrating an example process 700 for providing VoLTE services at a UE. Process 700 may be implemented, for example, by UE 410.

Process 700 may include attaching to the roaming network (block 710). For example, UE 410 may attach to roaming network 210. The home network of UE 410 may be a network that has a roaming agreement with roaming network 210. Additionally, the home network may include a network in which IMS/VoLTE services are not supported.

Process 700 may further include receiving, from the roaming network, and installing a VoLTE client application (block 720). As previously mentioned, one or more devices in roaming network 210 may push or otherwise download VoLTE client application 420.

Process 700 may further include using the downloaded VoLTE client application to provide VoLTE and/or RCS based network services (block 730). For example, one or more devices, in IMS/VoLTE network 250, may interact with VoLTE client application 420 to provide the VoLTE and/or RCS based network services.

Figure 8:
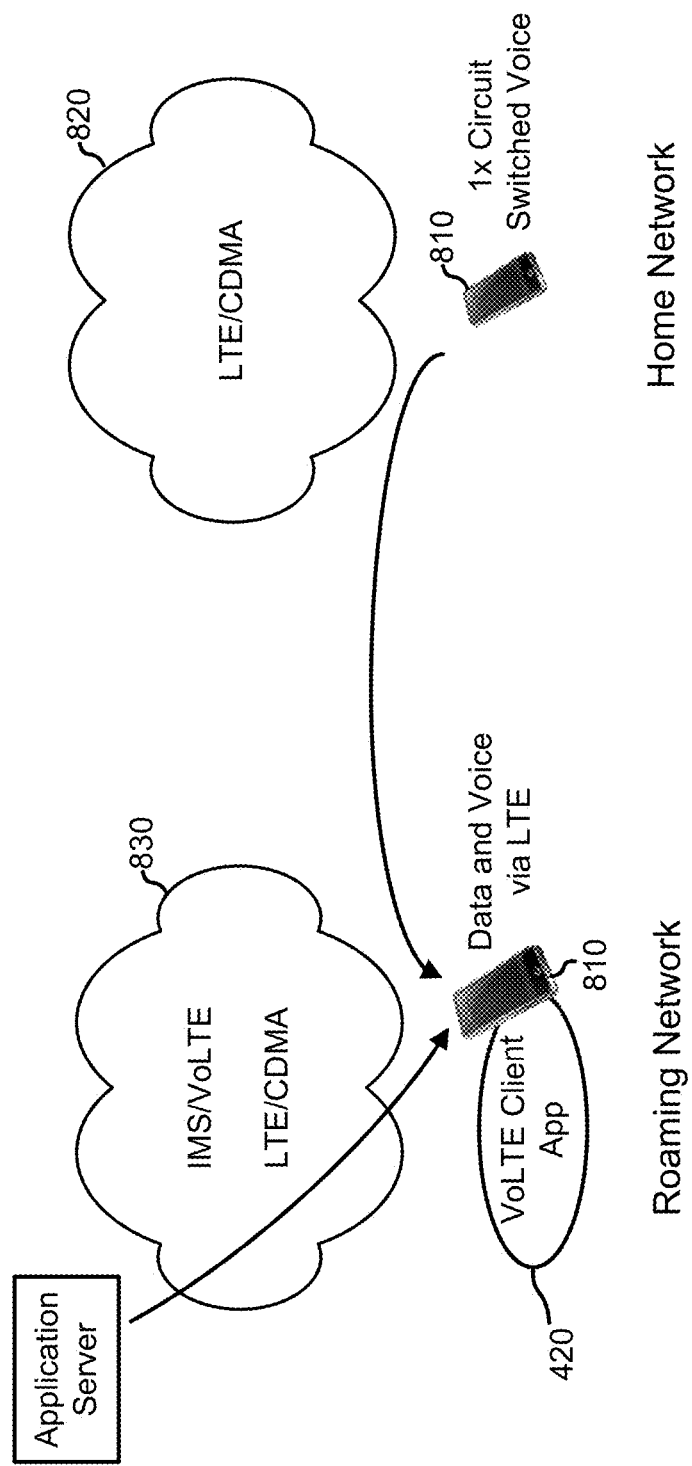
FIG. 8 is a diagram conceptually illustrating an example of environment, according to another possible implementation.

FIG. 8 is a diagram conceptually illustrating an example of an environment, according to another possible implementation, in which VoLTE client application 420 may be used to provide services to a roaming UE.

In FIG. 8, a UE 810 may be associated with a home network that includes an LTE/CDMA (code division multiple access) network 820. LTE/CDMA network 820 may provide data to its users via LTE while connecting telephone calls via circuit-switched voice (e.g., via CDMA). UE 810 may roam to another network, such as network 830, which may include a LTE/CDMA network that also implements VoLTE and IMS. Network 830 may thus be able to provide both voice and data using packetized data streams.

Assume that providers associated with network 820 and network 830 have an established roaming agreement. When UE 810 roams to network 830, UE 810, when initially connecting to network 830, may be able to use circuit-switched voice connections and LTE data connections. To enhance the capabilities of UE 810, VoLTE client application 420 may be pushed or otherwise downloaded to UE 810. Other information, such as the mobile device number (MDN), or other information relating to UE 810, may also be pushed or otherwise downloaded to UE 810. After installation at UE 810, VoLTE client application 420 may increase the functionality of UE 810 to operate with the IMS/VoLTE features of network 830. UE 810 may, for example, use VoLTE client application 420 to interact with the IMS/VoLTE functionality of network 830 to give UE 810 VoLTE/RCS features (e.g., voice over LTE, instant messaging, chat, live video sharing, and file transfer).

In the implementations described above, VoLTE client application 420 is described as interacting with IMS/VoLTE network devices to provide services, such as voice services, that are implemented by the IMS/VoLTE network. In some implementations, however, VoLTE client application 420 may alternatively or additionally be capable of providing voice, and/or other services, such as services provided through an over the top (OTT) data connection.

As described previously, a VoLTE client may be installed at a roaming UE that attaches to network that supports VoLTE servers. The home network of the UE and the roaming network may have an established roaming agreement.

As will be described with respect to FIGS. 9-14, in additional embodiments, a roaming mobile device may correspond to a mobile device that is associated with a user that is traveling or otherwise enters a geographical graphical area covered by a telecommunication provider that can communicate with the mobile device that is associated with the user. For example, an international traveler may enter a country that is not covered by the traveler's telecommunications provider. The country may, however, include a local telecommunications provider that provides wireless coverage that is physically compatible with the traveler's mobile device. In other words, the mobile device of the traveler may be capable of communicating with base stations associated with the local telecommunications provider.

Consistent with aspects described herein, a user (e.g., an international traveler) may obtain wireless network connectivity from a local telecommunications provider by replacing a UICC (Universal Integrated Circuit Card) in the user's mobile device. The user may be able to easily and conveniently determine whether the user's particular mobile device is compatible with the network of the telecommunications provider. When the user's mobile device initially attaches, using the provided UICC, to the network of the telecommunications provider, a VoLTE client application, such as a downloadable application, may be installed at the mobile device. The VoLTE client application may enable the mobile device to subsequently place telephone calls, through the network, using VoLTE.

In one implementation, an automated vending machine or kiosk may be installed, such as in airports, to allow the user to potentially obtain network connectivity from the network of the telecommunications provider.

Figure 9:
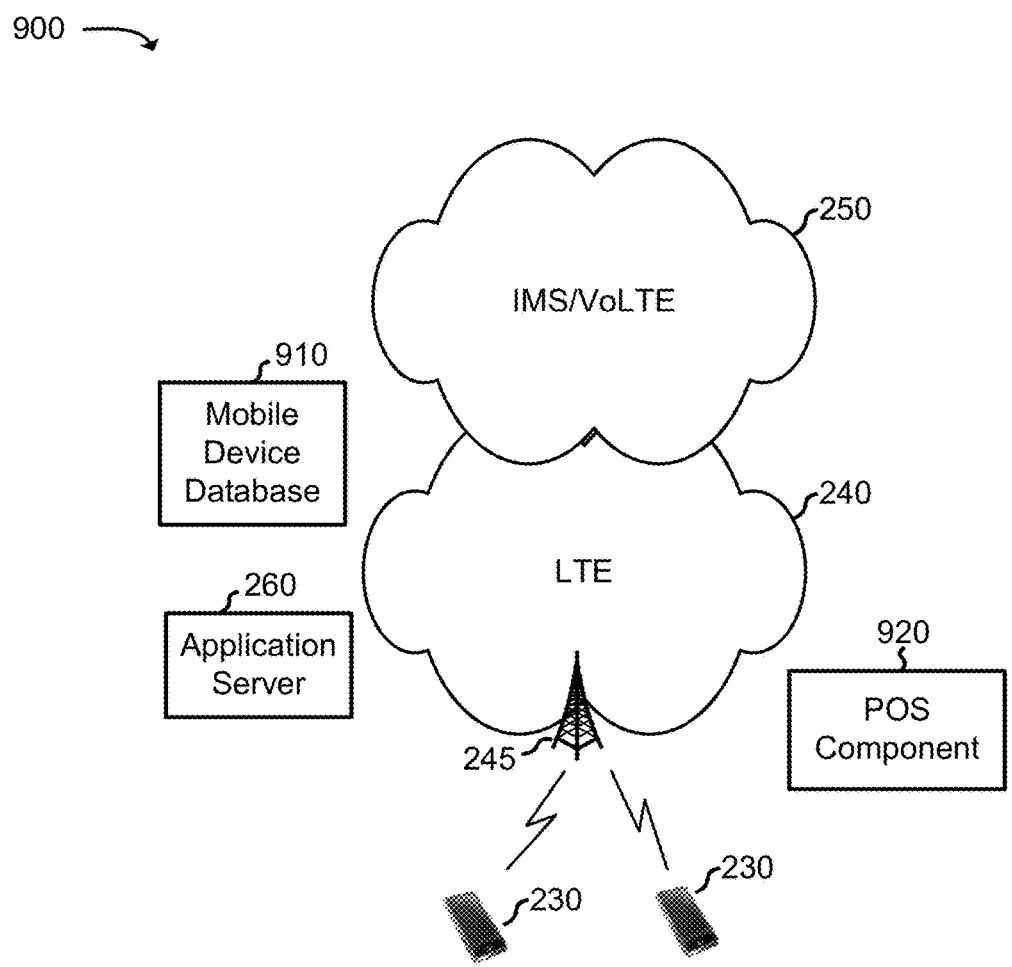
FIG. 9 is a diagram of an example environment in which systems and/or methods described herein may be implemented according to additional implementations.

FIG. 9 is a diagram of an example environment 900 in which systems and/or methods described herein may be implemented. Environment 900, as illustrated, may be similar to roaming network 210, as previously described with respect to environment 200 (FIG. 2). For brevity, the description of components previously described, with respect to environment 200, may not be repeated.

Environment 900 may include mobile device database 910 and point-of-sale (POS) component 920. Mobile device database 910 may implement a database that maintains information about mobile devices. Mobile device database 910 may include information about mobile devices that are manufactured or used in a number of different countries. Mobile device database 910 may thus include a global database of mobile devices. For each mobile device, for which information is stored in mobile device database 910, mobile device database 910 may store an indication of whether the mobile device is compatible with the wireless network operated by a particular telecommunications provider (e.g., with LTE network 240 and/or IMS/VoLTE network 250).

As one example, mobile device database 910 may include, for various makes and models of mobile devices, an indication of the radio technologies and/or frequency bands used by the mobile devices, an indication of the operating system implemented by the mobile devices, and/or other information relating to mobile devices. For instance, in some implementations, mobile device database 910 may store pictures of mobile devices, or other information, that may be used to assist in identifying a particular mobile device.

POS component 920 may include one or more devices configured to access mobile device database 910 and provide services to users, of mobile devices, relating to the providing of network connectivity to the mobile devices. POS component 920 may, for example, assist a user of a mobile device in determining whether the user's mobile device is compatible with network 240, and when the user's mobile device is determined to be compatible, enabling the mobile device to connect to network 240.

In one implementation, POS component 920 may include, or may be incorporated as part of, an automated vending machine or kiosk via which a user may interact to obtain connectivity to network 240. In this situation, POS component 920 may include a display (e.g., a touch screen display) through which a user may enter information relating to a mobile device and may include a dispensing mechanism through which a UICC may be dispensed to the user. In other implementations, POS component 920 may include an application, such as a software application installed on a computer or tablet, with which a retail worker may enter information to determine whether a mobile device of the user is compatible with network 240.

Although FIG. 9 illustrates example components of environment 900, in other implementations, environment 900 may contain fewer components, different components, differently arranged components, or additional components than those depicted. Alternatively, or additionally, one or more components of environment 900 may perform one or more other tasks described as being performed by one or more other components of environment 900. Further, although described herein is a "database," mobile device database 910 may more generally represent a single computing device, a cluster of computing devices (e.g., blades or rack-mounted server computers) that are co-located or geographically distributed, cloud-based (e.g., computing as a service) computing solutions, or other arrangements of computing devices that maintain one or more data structures and provide information to POS components 920.

Figure 10:
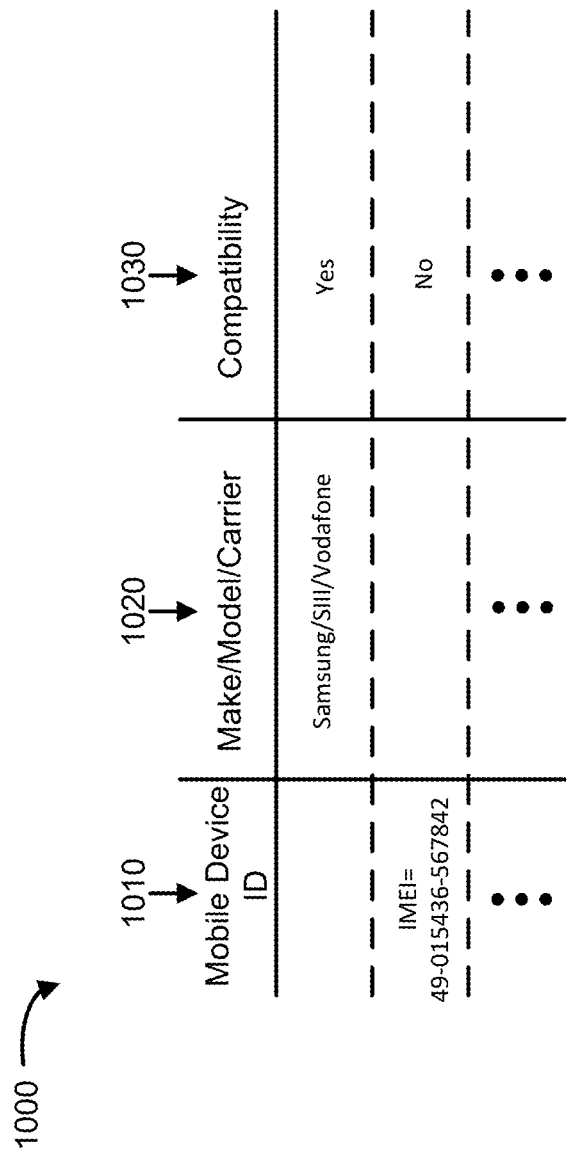
FIG. 10 is a diagram illustrating an example data structure that may be maintained by a mobile device database.

FIG. 10 is a diagram illustrating an example data structure 1000, such as a data structure that may be maintained by mobile device database 910. Data structure 1000 may generally be used to store information relating to whether various makes and models of mobile devices are compatible with network 240.

As illustrated, data structure 1000 may include a number of fields, including: mobile device identification (ID) field 1010, make/model/carrier/carrier field 1020, and compatibility field 1030. The fields shown for data structure 1000 are examples. In alternative possible implementations, different, fewer, or additional fields may be implemented.

Mobile device identification field 1010 may include one or more values that uniquely identify a particular mobile device and/or a particular make/model/carrier of mobile device. For example, mobile device identification field 1010 may include a device serial number or model number. As another example, in some implementations, data structure 1000 may alternatively or additionally include information relating to particular mobile devices. In this situation, mobile device identification field 1010 may include, for example, an International Mobile Station Equipment Identity (IMEI) value, an international mobile subscriber identity (IMSI) value, a subscriber integrated services digital network (MSISDN) value, or other values that may be used to uniquely identify a particular mobile device.

Make/model/carrier field 1020 may include information relating to a particular manufacturer and/or model of a mobile device. In some situations, it may be useful to identify a mobile device based on the manufacturer and model of the mobile device. Alternatively or additionally, the home network telecommunications provider (carrier) or country may be useful when identifying the radio interface compatibility device. Make/model/carrier field 1020 may thus alternatively or additionally include information relating to particular carriers and/or countries (or other geographical areas).

Compatibility field 1030 may indicate whether the corresponding mobile device is compatible with (i.e., is able to form a radio connection with) a wireless network (e.g., a cellular wireless network) of the telecommunication provider that operates mobile device database 910 and/or POS component 920. In one implementation, compatibility field 1030 may include a binary indication (yes/no) of whether the mobile device is compatible. Alternatively or additionally, compatibility field 1030 may include more detailed information, such as information relating to the radio technologies, frequency bands, or other information that can be used to determine whether the mobile device is compatible.

Two example records are particularly illustrated for data structure 1000. As illustrated, in the first record, mobile device identification field 1010 may be empty and make/model/carrier field 1020 may indicate a particular make, model, and carrier ("Samsung/SIII/Vodaphone"). The first record may be a general entry for mobile devices associated with the particular make, model, and carrier. As indicated, this make, model, and carrier may be compatible with network 240. The second record in data structure 1000 may apply to a particular mobile device associated with the IMEI value "49-015436-567842" (mobile device ID field 1010). In this case, make/model/carrier field 1020 is empty and compatibility field 1030 may indicate that the mobile device is not compatible with network 240.

Figure 11:
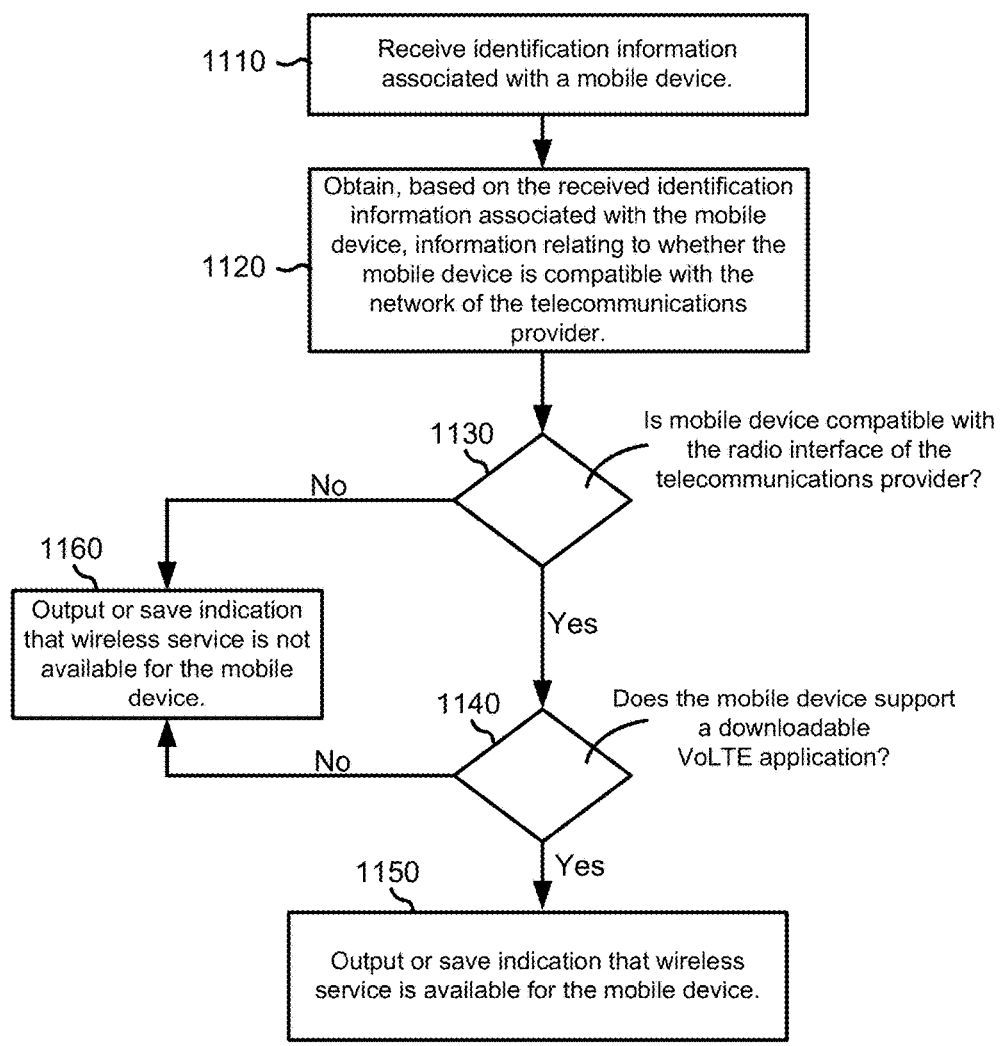
FIG. 11 is a flowchart illustrating an example process for determining whether a mobile device is compatible with a network supported by a telecommunications provider.

FIG. 11 is a flowchart illustrating an example process 1100 for determining whether a mobile device is compatible with a network supported by a telecommunications provider (e.g., network 240). In one implementation, process 1100 may be performed by POS component 920.

Process 1100 may include receiving identification information associated with a mobile device (block 1110). As previously discussed, the identification information may be structured in a variety of possible formats. For example, the IMEI value or MSISDN value, associated with mobile device, may be received (e.g., the user may type in the IMEI or MSISDN values at an automated kiosk). Alternatively or additionally, some combination of the make, model, and carrier that is associated with the home network of the mobile device, may be received. In other possible implementations, a user of the mobile device may download an application, such as an application provided via a local area network connection (e.g., Wi-Fi), to the mobile device. The application may analyze the mobile device and upload identification information for the mobile device (e.g., to POS component 920) and/or other network compatibility information.

Process 1100 may further include obtaining, based on the identification information, information relating to whether the mobile device is compatible with the network of the telecommunications provider (block 1120). For example, POS component 920 may query mobile device database 910 to obtain the information relating to whether the mobile device is compatible with the network of the telecommunications provider.

Process 1100 may further include determining whether the mobile device is compatible with the radio interface of the network of the telecommunications provider (block 1130). The determination of whether the mobile device is compatible with the radio interface may be based on the information received in block 1120. For example, as previously discussed, the information relating to whether the network of the telecommunications provider is compatible with the mobile device may directly indicate whether the mobile device is compatible. Alternatively, the information obtained in block 120 may include technical specifications relating to the radio interface of the mobile device (e.g., radio technologies used by the mobile device, frequency bands available, etc.). In this case, the determination of whether the mobile device is compatible may include comparing the technical specifications relating to the radio interface of the mobile device to the corresponding technical specifications of the network of the telecommunications provider. For example, the supported frequency bands of the mobile device may be compared to the supported frequency bands of the network to determine whether the mobile device is compatible with the network.

When the mobile device is determined to be compatible with the radio interface of the telecommunications provider (block 1130—YES), process 1100 may further include determining whether the mobile device supports a downloadable VoLTE application (block 1140). The downloadable VoLTE application may include VoLTE client application 420. The determination of whether the mobile device supports VoLTE client application 420 may be based on the operating system of the mobile device or based on other technical specifications of the mobile device.

When the mobile device is determined to support the downloadable VoLTE application (block 1140—YES), process 1100 may further include outputting or saving an indication that a wireless service is available for the mobile device (block 1150). For example, in the situation in which POS component 920 includes an automated kiosk or vending machine, POS component 920 may inform the user that wireless service is available may provide the user with a pricing options and/or other information relating to wireless service that may be provided to the user. In the situation in which POS component 920 is operated by a sales associate at a retail store, POS component 920 may inform the sales associated that wireless service is available. The sales associate may then inform the user of the mobile device.

When the mobile device is not compatible with the radio interface of the telecommunications provider or when the mobile device does not support a downloadable VoLTE application (block 1130—NO, or block 1140—NO), process 1100 may include outputting or saving an indication that wireless service is not available for the mobile device (block 1160). In this situation, the user of the mobile device may be informed that wireless service cannot be provided by the telecommunications provider.

Figure 12:
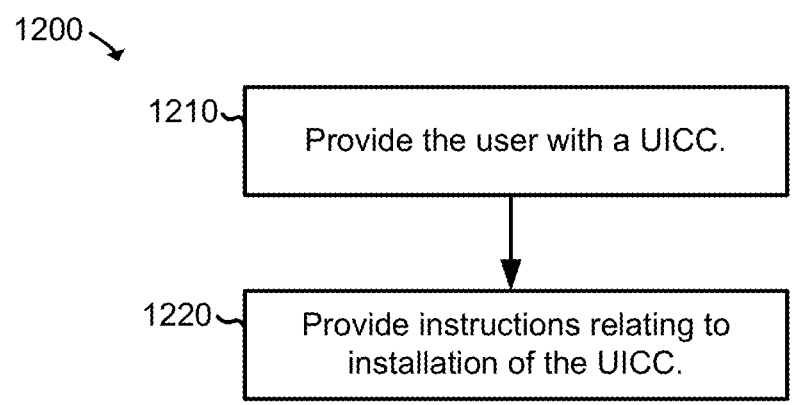
FIG. 12 is a flowchart illustrating an example process for providing wireless service to a mobile device.

FIG. 12 is a flowchart illustrating an example process 1200 for providing wireless service to a mobile device. In one implementation, process 1200 may be performed by POS component 920 and may be performed in response to the determination that wireless services are available for the mobile device (e.g., based on the performance of block 1150 of FIG. 11).

Process 1200 may include providing the user of the mobile device with a UICC (block 1210). The UICC may contain data and/or processing instructions to enable the mobile device to connect to the network of the telecommunications provider (e.g., network 240). For example, the UICC may include an IMSI value, network authentication keys, a Universal Subscriber Identity Module (USIM) application or a subscriber identification module (SIM) application. Additionally, the UICC may include a public land mobile network (PLMN) list that identifies preferred networks to which the mobile device is to attach. The PLMN list may include the networks associated with the telecommunications provider as having the highest priority.

Process 1200 may further include providing instructions relating to installation of the UICC (block 1220). In situations in which POS component 920 includes an automated vending machine or kiosk, the UICC may be automatically dispensed to the user. POS component 920 may provide instructions (e.g., via a graphical display) to the user for removing the current UICC from the mobile device and replacing it with the newly dispensed UICC. The instructions may be obtained, for example, by POS component 920, based on a query to mobile device database 910.

In some implementations, POS component 920 may additionally include a mechanism for users to return UICCs. For example, POS component 920 may include a vending machine installed in an airport. Users may thus conveniently obtain UICCs after arriving at the airport on an inbound flight and may drop off the UICCs before a corresponding outbound flight.

In situations in which POS component 920 is operated by a sales associate at a retail store, POS component 920 may provide the instructions, relating to installation of the UICC, to the sales associate, who may then replace the UICC card for the customer.

Figure 13:
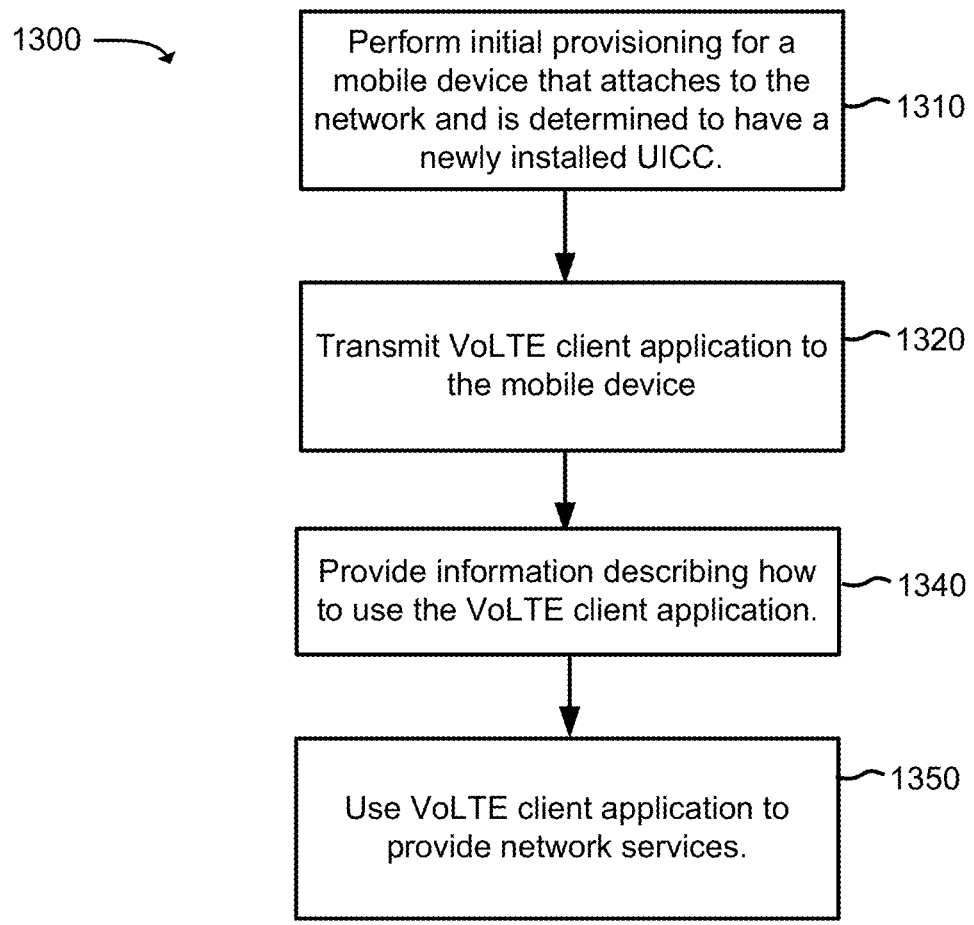
FIG. 13 is a flowchart illustrating an example process for that may be performed when a mobile device initially attaches to a network.

FIG. 13 is a flowchart illustrating an example process 1300 that may be performed when a mobile device initially attaches to the network of the telecommunications provider. Process 1300 may be implemented, for example, by one or more of the devices in network 240 and/or IMS/VoLTE network 250, such as MME 242, SGW 244, HSS 246, and/or S-CSCF 255.

Process 1300 may include performing initial provisioning for a mobile device that attaches to the network and is determined to have a newly installed UICC (block 1310). For example, after initial insertion of the UICC and powering up of the mobile device, the mobile device may go through an initial provisioning and activation process. The initial provisioning process may include personalizing the UICC with subscriber data (e.g., a MSISDN number) and/or registering the UICC with network 240.

Process 1300 may further include transmitting a VoLTE client application to the mobile device (block 1320). For example, VoLTE client application 420 may be pushed, or otherwise downloaded, from application server 260. The mobile device may subsequently install VoLTE client application 420. Alternatively or additionally, VoLTE client application 420 may be provided from a different source, such as from POS component 920.

In some implementations, a text message or other message may be sent to the mobile device to inform the user, and/or to obtain permission from the user, to download and install VoLTE client application 420. An example of such a message is illustrated in FIG. 6 (as previously discussed). In an alternative implementation, the text message may simply inform that user that an application is available to install, and the user may then take additional steps to install the application (e.g., searching for the application at an "app" store, installing the application, etc.).

In some implementations, instead of notifying the user of the availability of VoLTE client application 420, client application 420 may be automatically installed at the mobile device (e.g., without notifying and/or prompting the user). In general, a number of techniques, including automatic "push"-based downloading techniques and techniques in which the user has a more active role in the installation of VoLTE client application 420, may potentially be used to download and install VoLTE client application 420. As previously mentioned, VoLTE client application 420 may enable the mobile device to use VoLTE services, such as placing a VoLTE-implemented telephone call. In some implementations, VoLTE client application 420 may enable features and/or services in addition to voice calls, such as services provided by the RCS suite. The services may include, for example, instant messaging, chat, live video sharing, video telephony, and file transfer.

Process 1300 may further include providing information describing how to use the VoLTE client application (block 1340). In one implementation, in response to installation of VoLTE client application 420, the user of the mobile device may be presented with a tutorial presenting the features of VoLTE client application 420 and instructions relating to how to use the features. The tutorial may be integrated as part of VoLTE client application 420 and/or may be provided using other techniques, such as through a web browser.

A user of the mobile device, at which VoLTE client application 420 is installed, may wish to use a VoLTE- and/or RCS-based network service, such as voice, instant messaging, chat, live video sharing, video telephony, and/or file transfer. Process 1300 may include using the VoLTE client application to provide network services (block 1350). For example, one or more devices, in IMS/VoLTE network 250, may interact with VoLTE client application 420 to provide the VoLTE and/or RCS based network services. For example, VoLTE client application 420 may implement one or more codecs and/or protocols needed to provide VoLTE-based voice services (e.g., telephone calls), such as a VoLTE quality of service (QoS) codec.

FIG. 14 is a diagram illustrating one example of signaling and/or data flows that may be used in environment 900 to provide VoLTE services to a roaming mobile device, illustrated as mobile device 230, such as a mobile device associated with a user that is traveling or otherwise entering a service area outside of the geographical range covered by the user's home telecommunication provider. The signaling/data flows that are illustrated in FIG. 14 may be implemented consistent with techniques discussed previously (e.g., consistent with processes 1100, 1200, and 1300).

As illustrated, UICC 1410 may be provided, by POS component 920, to a user of mobile device 230. UICC 1410 may be installed in mobile device 230 (e.g., the user may physically place UICC 1410 into a compatible slot in mobile device 230). When mobile device 230 is powered on, mobile device 230 may attach to network 240, which may cause initial provisioning and configuration of mobile device 230 and/or of network 240 (arrow "1"). The provisioning may be performed by an over-the-air (OTA) server, illustrated as application server 260. Additionally, VoLTE client application 420 may be downloaded to mobile device 230 (arrow "2"). The user of mobile device 230 may subsequently use VoLTE client application 420 to obtain the VoLTE based voice services (e.g., telephone calls, instant messaging services, etc.) from network 240 (arrow "3"). At some point, the user may return UICC 1410, to POS component 920, and may physically place their original UICC back into their mobile device, thus enabling the mobile device to be used with the home carrier of the user.

FIG. 15 is a diagram of example components of a device 1500. Each of the devices illustrated in FIGS. 1-4, 6, 8, 9, and 14 may include one or more devices 1500. Device 1500 may include bus 1510, processor 1520, memory 1530, input component 1540, output component 1550, and communication interface 1560. In another implementation, device 1500 may include additional, fewer, different, or differently arranged components. Some non-limiting examples of device 1500, with additional and/or different components, are discussed below.

Bus 1510 may include one or more communication paths that permit communication among the components of device 1500. Processor 1520 may include a processor, micropro-cessor, or processing logic that may interpret and execute instructions. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500, such as a keyboard, a keypad, a button, a switch, etc. Output component 1550 may include a mechanism that outputs information to the operator, such as a display, a speaker, one or more light emitting diodes (LEDs), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 5, 7, and 11-13, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
   receiving, by one or more devices, identification information relating to a mobile device;
   determining, by the one or more devices and based on the identification information, that the mobile device is compatible with a wireless network, the determination that the mobile device is compatible with the wireless network being further based on:
      a determination that a radio interface of the mobile device is compatible with a radio interface of the wireless network, and
      a determination that the mobile device supports installation of a Voice over Long Term Evolution (VoLTE) client application;
   transmitting, by the one or more devices and based on the determination that the mobile device is compatible with the wireless network, the VoLTE client application to the mobile device, the VoLTE client application enabling the mobile device to use VoLTE services that are provided by the wireless network, wherein the mobile device does not support the VoLTE services, that are provided by the wireless network, without installation of the VoLTE client application; and
   communicating, by the one or more devices, with the mobile device and the VoLTE client application, to provide one or more VoLTE services to the mobile device.

2. The method of claim 1, wherein the determination that the radio interface of the mobile device is compatible with the radio interface of the wireless network further comprises:
   comparing supported frequency bands of the mobile device to supported frequency bands of the network.

3. The method of claim 1, wherein transmitting of the VoLTE client application is performed as part of an initial registration process of the mobile device with the wireless network.

4. The method of claim 1, wherein the identification information includes a value uniquely associated with the mobile device.

5. The method of claim 4, wherein the value uniquely associated with the mobile device includes an International Mobile Station Equipment Identity (IMEI) value.

6. The method of claim 1, wherein the identification information includes an indication of a telecommunications provider associated with a home network of the mobile device.

7. The method of claim 1, further comprising:
   dispensing, via an automated vending machine, a Universal Integrated Circuit Card (UICC) for installation in the mobile device, the communication being provided via the UICC.

8. The method of claim 1, wherein the identification information is obtained via an application downloaded, by the one or more devices, to the mobile device.

9. The method of claim 1, wherein the determination that the mobile device is compatible with the wireless network is based on a database query.

10. A system comprising:
    a point-of-sale component to:
       receive identification information relating to a mobile device; and
       determine, based on the identification information, that the mobile device is compatible with a wireless network, the determination that the mobile device is compatible with the wireless network including determining that the mobile device supports installation of a Voice over Long Term Evolution (VoLTE) client application; and
    one or more network devices to:
       transmit, based on the determination that the mobile device is compatible with the wireless network, the VoLTE client application to the mobile device, the VoLTE client application enabling the mobile device to use VoLTE services that are provided by the wireless network, wherein the mobile device does not support the VoLTE services, that are provided by the wireless network, without installation of the VoLTE client application; and
       communicate with the mobile device and the VoLTE client application, to provide one or more VoLTE services to the mobile device.

11. The system of claim 10, wherein, when determining that the mobile device is compatible with the wireless network, the point-of-sale component is further to:
    determine that a radio interface of the mobile device is compatible with a radio interface of the wireless network.

12. The system of claim 10, wherein transmitting of the VoLTE client application is performed as part of an initial registration process of the mobile device with the wireless network.

13. The system of claim 10, wherein the identification information includes a value uniquely associated with the mobile device.

14. The system of claim 10, wherein the identification information includes an indication of a telecommunications provider associated with a home network of the mobile device.

15. The system of claim 10, wherein the network includes a Long Term Evolution (LTE) network.

16. The system of claim 10, wherein the determination that the mobile device is compatible with the wireless network is based on a database query.

17. A device comprising:
a memory; and
at least one processor to execute instructions in the memory to:
  receive identification information relating to a mobile device;
  determine, based on the identification information, that the mobile device is compatible with a wireless network, the determination that the mobile device is compatible with the wireless network being further based on:
    a determination, based on a query to a mobile device database, that a radio interface of the mobile device is compatible with a radio interface of the wireless network, and
    a determination that the mobile device supports installation of a Voice over Long Term Evolution (VoLTE) client application; and
  provide, based on the determination that the mobile device is compatible with the wireless network, a Universal Integrated Circuit Card (UICC) for the mobile device, the UICC including data or processing instructions to cause the mobile device to connect to the wireless network and download the VoLTE client application to the mobile device, the VoLTE client application enabling the mobile device to use VoLTE services that are provided by the wireless network, wherein the mobile device does not support the VoLTE services, that are provided by the wireless network, without installation of the VoLTE client application.

18. The device of claim 17, wherein the identification information includes a value uniquely associated with the mobile device.

19. The device of claim 17, wherein the value uniquely associated with the mobile device includes an International Mobile Station Equipment Identity (IMEI) value.

20. The device of claim 17, wherein the identification information is obtained via an application downloaded, by the devices, to the mobile device.

* * * * *